US012759453B2

(12) United States Patent
Nilsson et al.

(10) Patent No.: US 12,759,453 B2
(45) Date of Patent: Oct. 13, 2026

(54) HARVESTER

(71) Applicant: KOMATSU FOREST AB, Umeå (SE)

(72) Inventors: Erik Nilsson, Obbola (SE); Peter Assarsson, Umeå (SE)

(73) Assignee: KOMATSU FOREST AB, Umeå (SE)

(*) Notice: Subject to any disclaimer, the term of this patent is extended or adjusted under 35 U.S.C. 154(b) by 352 days.

(21) Appl. No.: 18/702,969

(22) PCT Filed: Oct. 18, 2022

(86) PCT No.: PCT/EP2022/078964
§ 371 (c)(1),
(2) Date: Apr. 19, 2024

(87) PCT Pub. No.: WO2023/066929
PCT Pub. Date: Apr. 27, 2023

(65) Prior Publication Data

US 2024/0416821 A1 Dec. 19, 2024

(30) Foreign Application Priority Data

Oct. 21, 2021 (SE) .................................... 2151281-9

(51) Int. Cl.
*B60P 3/41* (2006.01)
*A01G 23/00* (2006.01)
(Continued)

(52) U.S. Cl.
CPC .............. *B60P 3/41* (2013.01); *A01G 23/006* (2013.01); *B60L 50/61* (2019.02); *A01G 23/083* (2013.01); *B60L 2240/70* (2013.01)

(58) Field of Classification Search
CPC .. B60P 3/41; B60L 50/61; B60L 50/60; B60L 58/12; B60L 53/10; A01G 23/08;
(Continued)

(56) References Cited

U.S. PATENT DOCUMENTS 8,556,008 B2 * 10/2013 Einola .................. B60W 10/30 180/165
2017/0361721 A1 * 12/2017 Prunty .................. B60L 15/38
2023/0294524 A1 * 9/2023 Wright .................. B60L 7/26 702/22

FOREIGN PATENT DOCUMENTS

CZ 2019565 4/2021
WO 2008097146 8/2008
WO WO-2008097146 A1 * 8/2008 ............ B62D 53/00

OTHER PUBLICATIONS

International Search Report and Written Opinion for International PCT Patent Application No. PCT/EP2022/078964 mailed Feb. 21, 2023 (8 pages).

* cited by examiner

*Primary Examiner* — Bobby Yeonjin Kim
(74) *Attorney, Agent, or Firm* — Fox Rothschild LLP; Carol E. Thorstad-Forsyth

(57) ABSTRACT

The disclosure relates to a harvester (10) for harvesting logs. The harvester comprises a traction arrangement (11) configured to drive the harvester, an articulated boom (13) configured to connect to a processing head, a fuel reservoir, an electrical energy generator fueled by a fuel from the fuel reservoir and configured for supplying power to the traction arrangement and the articulated boom, and an electrical connector (17) configured for coupling the electrical energy generator to an electrical energy storage of a shuttle. The harvester is configured to load a harvested log onto a coupled shuttle and charge the electrical energy storage of said coupled shuttle using electrical energy from the electrical energy generator.

15 Claims, 4 Drawing Sheets

(51) Int. Cl.
*A01G 23/083* (2006.01)
*B60L 50/61* (2019.01)

(58) Field of Classification Search
CPC .. A01G 23/083; A01G 23/087; A01G 23/006; B64U 50/34; G05D 1/69; G06Q 50/02
See application file for complete search history.

HARVESTER

CROSS REFERENCE TO RELATED APPLICATIONS

This application is a U.S. National Phase Application of PCT International Application No. PCT/EP2022/078964, filed on Oct. 18, 2022, which is an International Application of and claims the benefit of priority to Swedish Patent Application No. 2151281-9, filed on Oct. 21, 2021. The entire contents of these Patent Applications are herein incorporated by reference.

FIELD OF THE INVENTION

The present invention relates to the fields of forestry and forest harvesting. More specifically, the disclosure relates to a forest harvester.

BACKGROUND ART

Forestry, and forest/wood harvesting, currently uses machinery, such as harvesters and forwarders, within a forest in order to harvest and transport wood within and from the forest. Such machinery are commonly driven using internal combustion engines which causes environmental impact due to the release of greenhouse gases when being used. Further, such machinery are heavy, especially a forwarder when loaded with harvested logs, and may consequently damage the soil of the forest.

Thus, within the field of forestry, there is an interest in reducing the environmental impact, such as reducing fuel consumption and/or minimizing soil damage of forestry machinery.

SUMMARY

It is an object to mitigate, alleviate or eliminate the above-identified deficiency in the art singly or in any combination and solve at least the above-mentioned problem.

According to an aspect of the present disclosure, a harvester for harvesting logs is provided. The harvester comprises a traction arrangement configured to drive the harvester, an articulated boom configured to connect to a processing head, a fuel reservoir, an electrical energy generator fuelled by a fuel from the fuel reservoir and configured for supplying power to the traction arrangement and the articulated boom, and an electrical connector configured for coupling the electrical energy generator to an electrical energy storage of a shuttle. The harvester is configured to load a harvested log onto a coupled shuttle and charge the electrical energy storage of said coupled shuttle using electrical energy from the electrical energy generator.

The present disclosure is based on the concept of a harvester being able to load harvested logs onto a coupled shuttle and being able to charge said coupled shuttle, wherein the shuttle is configured to forward harvested logs. This concept provides multiple advantages to the prior art, which commonly uses a harvester which harvests logs and places them on the ground, wherein the harvested logs are then picked up by a forwarder which loads the harvested logs onto itself. Firstly, the energy usage is reduced due to loading the harvested logs directly from the harvester to a coupled shuttle, instead of first placing the logs on the ground and then loading the forwarder. Further, the environmental impact, such as soil damage, may be reduced by enabling for forwarding harvested logs via shuttles instead of a forwarder, due to the forwarder being a heavy piece of machinery in comparison to a shuttle. Soil damage may be further reduced by enabling the use of a plurality of shuttles rather than one forwarder, as the pressure exerted onto the soil by a plurality of shuttles is divided, rather than the pressure coming from a single forwarder. The harvester being able to charge a coupled shuttle allows for the use of electrified shuttles, and that the shuttles may comprise a smaller sized electrical energy storage, such as a battery, than if they could not be charged by the harvester. Further, the harvester being able to charge a shuttle allows for continuous operation of the electrified shuttles, as they may be charged whilst in operation, i.e. whilst being loaded with harvested logs. Furthermore, charging of a coupled shuttle further allows for a longer duration of operation of the shuttle before the electrical energy storage runs out. The shuttles may be configured for driverless, or autonomous, operation. In other words, the shuttles may be self-driving shuttles.

The prior art, in which a harvester and a forwarder is are used requires two operators, one for the harvester and one for the forwarder, while the present disclosure eliminates the need for an operator of a forwarder, as the operator of the harvester is able to load harvested logs directly onto a shuttle, wherein the shuttle may be configured to autonomously drive the harvested logs to an unloading location.

In another prior art solution, a harvester may be combined with a forwarder, which may be termed a “harvarder”. A harvarder may be a harvester which comprises a trailer comprising a compartment for receiving harvested logs. A harvarder has an advantage in light of the harvester plus forwarder solution by only requiring one operator, rather than one operator for the harvester and another operator for the forwarder. However, whenever a harvarder is forwarding harvested logs, the harvester portion is being unused. Thus, whenever a harvarder is forwarding, harvesting is put on hold. Consequently, when the harvarder is harvesting logs, the forwarding is put on hold. Thus, the uptime of the harvarder is significantly lower than if a harvester and a forwarder would be used. Additionally, the soil damage caused by a harvarder is higher than what a harvester and a forwarder would cause due to the harvarder comprising the heavy equipment of a harvester and a forwarder. The present disclosure solves this problem by providing a harvester which enables the use of autonomous, or self-driving, shuttles to act as forwarders.

The harvester may be configured for felling, delimbing and/or bucking trees in order to produce harvested logs. The traction arrangement of the harvester may comprise, for example, continuous tracks, and/or wheels. The fuel reservoir may, alternatively, be termed, for example, a fuel tank. By fueling the electrical energy generator with fuel from the fuel reservoir, the runtime of the harvester is greatly increased, in comparison to if the harvester would be powered by a battery, due to the higher energy density of fuel in comparison to a battery.

The articulated boom may be powered directly by the electrical energy generator. Alternatively, the harvester may comprise one or more mechanical device and/or one or more hydraulic device which are powered by the electrical energy generator and which are configured for powering the articulated boom. Thus, the articulated boom may be mechanically and/or hydraulically powered.

The electrical connector may, alternatively, be termed an electrical coupling. The harvester may further comprise a mechanical connector for mechanically connecting the harvester to a shuttle. The electrical connector may together with the mechanical connector form a coupling arrangement, which may reduce the risk of the disconnection. The coupling arrangement may further protect the electrical connector.

The harvester may be configured to load said harvested log onto said coupled shuttle at a same time as charging the electrical energy storage of said coupled shuttle. Thus, by being able to load and to charge a coupled shuttle at the same time, the efficiency of the harvester may be increased.

The harvester may be configured to charge said coupled shuttle by a charging amount. Thus, the harvester may allow for making sure that the coupled shuttle is charged with a required level of electrical energy. The harvester may allow for charging the coupled shuttle with a charging amount such that the coupled shuttle may be able to operate during the remainder of the operation, i.e. working day or shift. Correspondingly, the harvester may allow for making sure that the coupled shuttle is not being charged more than is required.

The charging amount may be determined based on at least one of a distance from the harvester to an unloading location, a determined, or estimated, electrical energy usage of a shuttle corresponding to a round trip between the harvester and the unloading location, an electrical energy level of the electrical energy storage of said coupled shuttle, and a determined load, i.e. weight, of harvested logs on said coupled shuttle.

The harvester may further comprise an electrical energy storage. The electrical connector may be configured for coupling the electrical energy storage of the harvester to an electrical energy storage of a shuttle. Further, the electrical energy generator may be connected to the electrical energy storage. By the term "electrical energy storage", it is further meant, for example, a battery, wherein the battery may be configured as, for example, a lithium-ion battery, lithium polymer battery or a lithium iron phosphate battery. The electrical energy storage may allow for the harvester to store electrical energy generated by the electrical energy generator. The electrical energy storage may allow the harvester to store electrical energy when the need for electrical energy is lower, such as when no shuttle is being charged by the harvester, and to supply additional electrical energy when the need for electrical energy is higher, such as when a shuttle is being charged by the harvester. Thus, the electrical energy storage may increase the efficiency of the harvester.

The harvester may further comprise at least one electrical motor electrically connected to the electrical energy generator and configured for supplying electrical power to the traction arrangement and the articulated boom. Thus, the harvester may be configured as a hybrid harvester. Powering the traction arrangement and the articulated boom using least one electrical motor may increase the efficiency of the harvester. Additionally, powering the traction arrangement and the articulated boom using least one electrical motor may reduce the environmental impact of the harvester due to a reduction of pollution.

The electrical energy generator may comprise an internal combustion engine, ICE, and a generator. The ICE may be fueled by fuel from the fuel reservoir and configured to deliver mechanical power to the generator. The generator may be configured to convert the mechanical power into electrical energy. The at least one electrical motor may be electrically connected to the generator. Thus, the harvester may be configured as an ICE-electric hybrid harvester. Using an ICE to generate electrical energy to power the traction arrangement and the articulated boom may be more efficient than powering the traction arrangement and the articulated directly via the ICE, thereby reducing the environmental impact of the harvester. The ICE may be, for example, a diesel engine.

The ICE may be configured to operate at a determined rate. By the term "rate" it is further meant, for example, revolutions per minute, RPM. The determined rate may allow for the ICE to be run in an optimally efficient mode. The ICE when run in the optimally efficient mode, i.e. at the determined rate, may be configured to optimise, or maximise, the ratio between mechanical power output, i.e. the torque, the RPM and fuel consumption. In other words, the ICE when run in the optimally efficient mode may maximise the mechanical power output per unit of fuel consumed. Put differently, there may exist a relation between the RPM of the ICE, the torque, and the fuel consumption. The determined rate may be dependent on the torque. Thus, the ICE may be operated at different determined rates depending on the current torque, in order to minimise fuel consumption. By powering the traction arrangement and the articulated boom via the at least one electrical motor, the required output of the ICE may be kept more stable, i.e. near, or at, the determined rate, in comparison to if the traction arrangement and the articulated boom would be powered directly by the ICE, since the required power output would change depending on the work performed by the traction arrangement and/or the articulated boom. A harvester further comprising an electrical energy storage may be able to run the ICE even more stable, i.e. even nearer, or at, the determined rate, by being able to store surplus electrical energy in the electrical energy storage. In other words, the electrical energy storage may be configured as an electrical energy buffer between the electrical energy generator and the traction arrangement and the articulated boom. Thus, operating the ICE at, or near, the determined rate may reduce the fuel consumption and reduce emissions of $CO_2$ etc. thereby reducing the environmental impact of the harvester.

However, the harvester is not limited to powering the traction arrangement and the articulated boom via the ICE. For example, the ICE may be configured to deliver mechanical power to the traction arrangement and the articulated boom, which may reduce the size and/or weight of the harvester, which may reduce the soil damage of the harvester when operating in a forestry environment.

The electrical energy generator may comprise a fuel cell. The fuel cell may be fueled by the fuel, which may be hydrogen, from the fuel reservoir. The fuel cell may further by configured to receive an oxidizing agent, such as oxygen, which may be received from the air surrounding the harvester, or from a second reservoir of the harvester. The fuel cell may be configured to convert chemical energy of the fuel (and the oxidizing agent) into electrical energy. Using a fuel cell, rather than an ICE, may further reduce the environmental impact of the harvester.

The articulated boom may comprise a connect system comprising an electrical interface and at least one of a mechanical interface and a hydraulic interface, wherein the connect system is configured to connect to a processing head. The connect system may be further configured to connect to a log grapple. Thus, the harvester may be able to switch between different tools, such as, for example, a processing head and a log grapple, thereby enabling the harvester to switch between different modes of operation. For example, if there is not shuttle coupled to, or in the vicinity of, the harvester, the harvester is unable to load the harvested logs onto a shuttle. The connect system may further comprise a 24 V interface and/or a Controller Area Network, CAN, interface. The harvester may then temporarily place the harvested logs on the ground near the harvester. When a shuttle is coupled to, or in the vicinity of, the harvester, the harvester is able to, using the connect system, switch from the processing head to the log grapple and to load the harvested logs on the ground onto the shuttle. Once the loading of the harvested logs is complete the harvester may then switch back to the processing head and continue harvesting. Thus, the harvester is able to continue harvesting even if there is not shuttle present at the time of harvesting. Further, the connect system removes the need for a forwarder due the harvester being able to load harvested logs from the ground onto a shuttle by itself.

The harvester may further comprise a tool holder. The tool holder may be configured to hold a processing head and/or a log grapple, i.e. a tool configured to be connected to the articulated boom. Thus, the tool holder may allow the harvester to bring a processing head and a log grapple to a work site. Further, the tool holder may be adapted to be easily accessible for the connect system. Thus, the harvester may switch between tools by either placing the currently used tool on the ground or in the tool holder and by connecting to another tool, which may currently be on the ground or in the tool holder.

The harvester may further comprise at least one sensor configured to gather sensory data from an environment around the harvester. The sensory data may comprise at least one of forestry conditions, driving, travel or ground, conditions, level of charge of an electrical energy storage of the harvester or of a coupled shuttle. The at least one sensor may comprise one or more camera(s), one or more radar(s), and/or one or more lidar(s).

The harvester may be configured for data communication with at least one of a shuttle, and an unmanned aerial vehicle, UAV. The harvester may comprise a charging dock configured for charging a UAV. The charging dock may be configured for electrically connecting a docked UAV to the electrical energy generator and to charge the UAV thereby. Thus, the harvest may allow for one or more UAVs to be operated in the neighbourhood of the harvester continuously.

The harvester may comprise a communication device configured for data communication such as, for example, WiFi-, 3G-, LTE-, 4G-, and/or 5G-communication. The communication device may further be configured for satellite navigation, such as, a global navigation satellite system, GNSS, and may be configured to communicate location data, such as locations or paths.

The data communication may comprise at least one of an electrical energy level of an electrical energy storage of a shuttle, a log load level of a shuttle, a driving path for a shuttle, a location of a shuttle, a location of the harvester, and a location of an unloading location. The data communication may further comprise a distance from the harvester to an unloading location, a determined, or estimated, electrical energy usage of a shuttle corresponding to a round trip between the harvester and the unloading location, an expected amount of remaining driving of a shuttle, an expected amount of electrical energy usage of a shuttle. The data communication allows for an increased optimisation of charging, and/or loading of a shuttle. The data communication may further comprise at least one of an electrical energy level of an electrical energy storage of a UAV, and a location of a UAV. The data communication may further comprise one or more images of a forestry scene taken by a UAV.

The harvester may further comprise an operator cab. The harvester may be configured to be operated by a user within the operator cab. The harvester may be configured to be remotely operated by a user. An operator may operate the harvester by utilising at least some of the sensory data gathered by the at least one sensor.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The invention will by way of example be described in more detail with reference to the appended schematic drawings, which show presently preferred embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
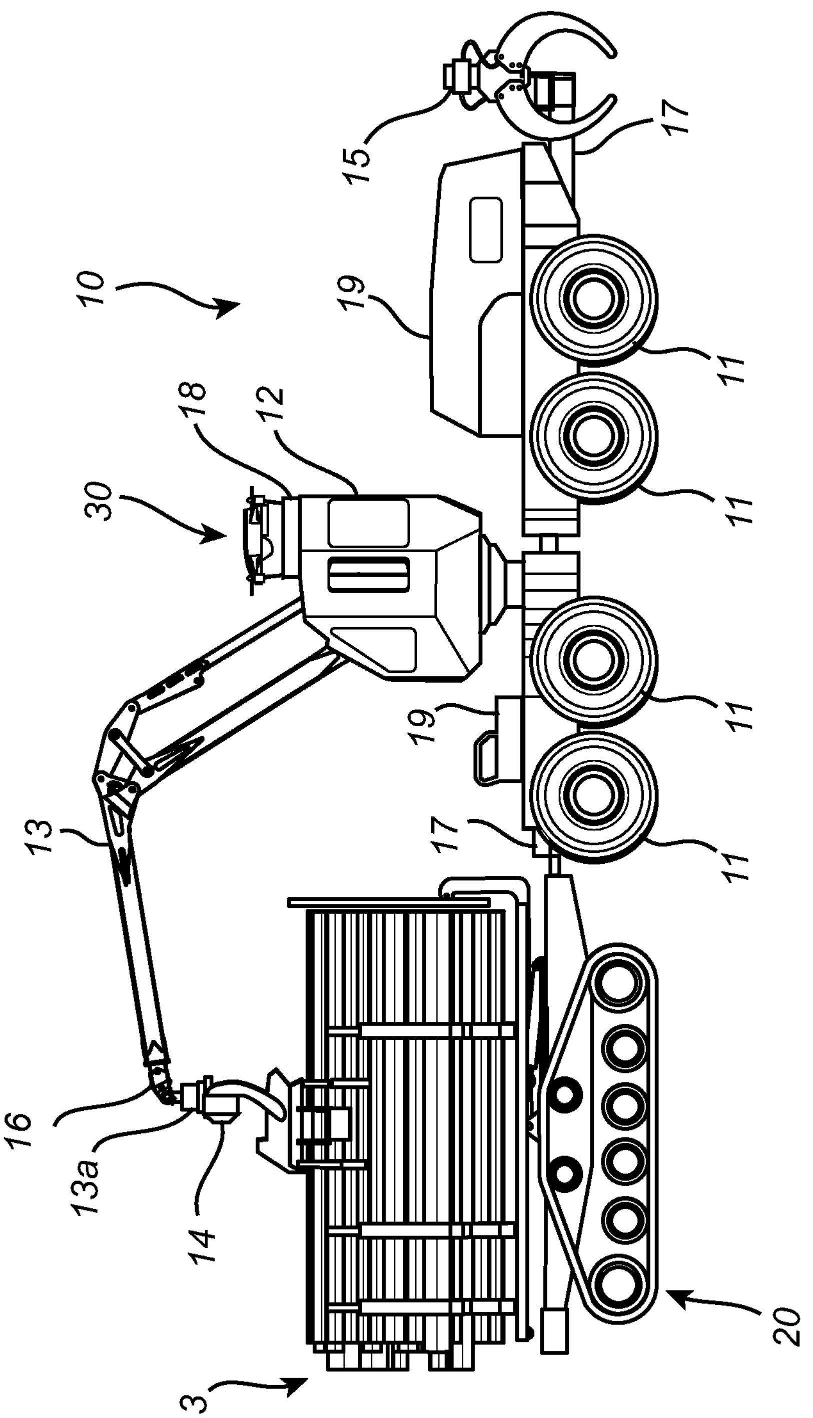
FIG. 1 shows a side view of a harvester according to an embodiment of the present disclosure.

FIG. 1 shows a side view of a harvester 10 according to an embodiment of the present disclosure.

The harvester 10 comprises a traction arrangement 11 configured to drive the harvester 10. The traction arrangement 11 comprises eight wheels 11, wherein four of the wheels 11 are shown in FIG. 1. It is to be understood that the remaining four wheels of the traction arrangement 11 are arranged on the other side of the harvester 10. The traction arrangement 11 is not limited to comprising wheels 11 and may for example comprise continuous tracks or a combination of continuous tracks and wheels. The harvester 10 further comprises a fuel reservoir (not shown; see FIG. 4), and an electrical energy generator (not shown; see FIG. 4) fueled by a fuel from the fuel reservoir. The fuel reservoir and the electrical energy generator may be arranged in a body 19 of the harvester 10. The harvester 10 further comprises an electrical connector 17 configured for coupling the electrical energy generator to an electrical energy storage of a shuttle 20. The harvester 10 is configured to load a harvested log 3 onto a coupled shuttle 20, and charge the electrical energy storage of said coupled shuttle 20 using electrical energy from the electrical energy generator, wherein the harvester 10 may be configured to load a harvested log 3 onto the coupled shuttle 20 at a same time as charging the electrical energy storage of the coupled shuttle 20.

The harvester 10 comprises an operator cab 12. The harvester 10 is configured to be operated by a user within the operator cab 12. However, the harvester 10 may be remotely operated by a user.

The articulated boom 13 comprises a connect system 13*a*. The connect system 13*a* comprises an electrical interface and at least one of a mechanical interface and a hydraulic interface. The connect system 13*a* is configured to connect to a harvester tool, such as a processing head 14 or a log grapple 15. The harvester 10 further comprises a tool holder 16, arranged at an end of the body 19 of the harvester 10. The tool holder 16 is configured to hold a harvester tool, such as a processing head 14 or a log grapple 15. In FIG. 1, a log grapple 15 is currently arranged in the tool holder 16. The tool holder 16 enables the harvester 10 to more easily switch between tools. Additionally, the tool holder 16 provides the harvester 10 with storage of one or more tools during driving.

The harvester 10 further comprises a charging dock 18 configured for charging an unmanned aerial vehicle, UAV, 30. The charging dock 18 is arranged on top of the operator cab 12. However, the charging dock 18 may be arranged on other parts of the harvester 10, such as on the body 19 of the harvester 10. FIG. 1 shows a UAV 30 which is docked in the charging dock 18 and is thereby charged. The harvester 10 may be configured to receive an image of a forestry scene in a neighbourhood of the harvester 10 by the UAV. The charging dock 30 may allow for one or more UAVs 30 to be operated in the neighbourhood of the harvester 10 continuously, since it is able to be charged at the charging dock 18.

The harvester 10 may further comprise an electrical energy storage (not shown; see FIG. 4) electrically connected to the electrical energy generator and charged thereby. The electrical energy storage may be arranged within the body 19 of the harvester 10.

The harvester 10 may further comprise at least at least one electrical motor electrically connected to the electrical energy generator and configured for supplying electrical power to the traction arrangement 11 and the articulated boom 13. The at least one electrical motor may be arranged within the body 19 of the harvester 10.

The electrical energy generator may comprise an internal combustion engine, ICE, and a generator, wherein the ICE is fueled by fuel from the fuel reservoir and configured to deliver mechanical power to the generator. The generator may be configured to convert the mechanical power into electrical energy. Alternatively, the electrical energy generator may comprise a fuel cell.

The harvester 10 shown in FIG. 1 comprises two electrical connectors 17, wherein the electrical connectors 17 are arranged at opposite ends of the harvester 10. In FIG. 1, the harvester 10 is coupled to a shuttle 20 via one of the electrical connector 17. The harvester 10 is currently loading a harvested log 3 onto a compartment of the shuttle 20 by using the articulated boom 13 and the processing head 14 connected to the articulated boom 13. It may be understood that the shuttle 20 is being charged by the harvester 10 via the electrical connector 17.

Figure 2:
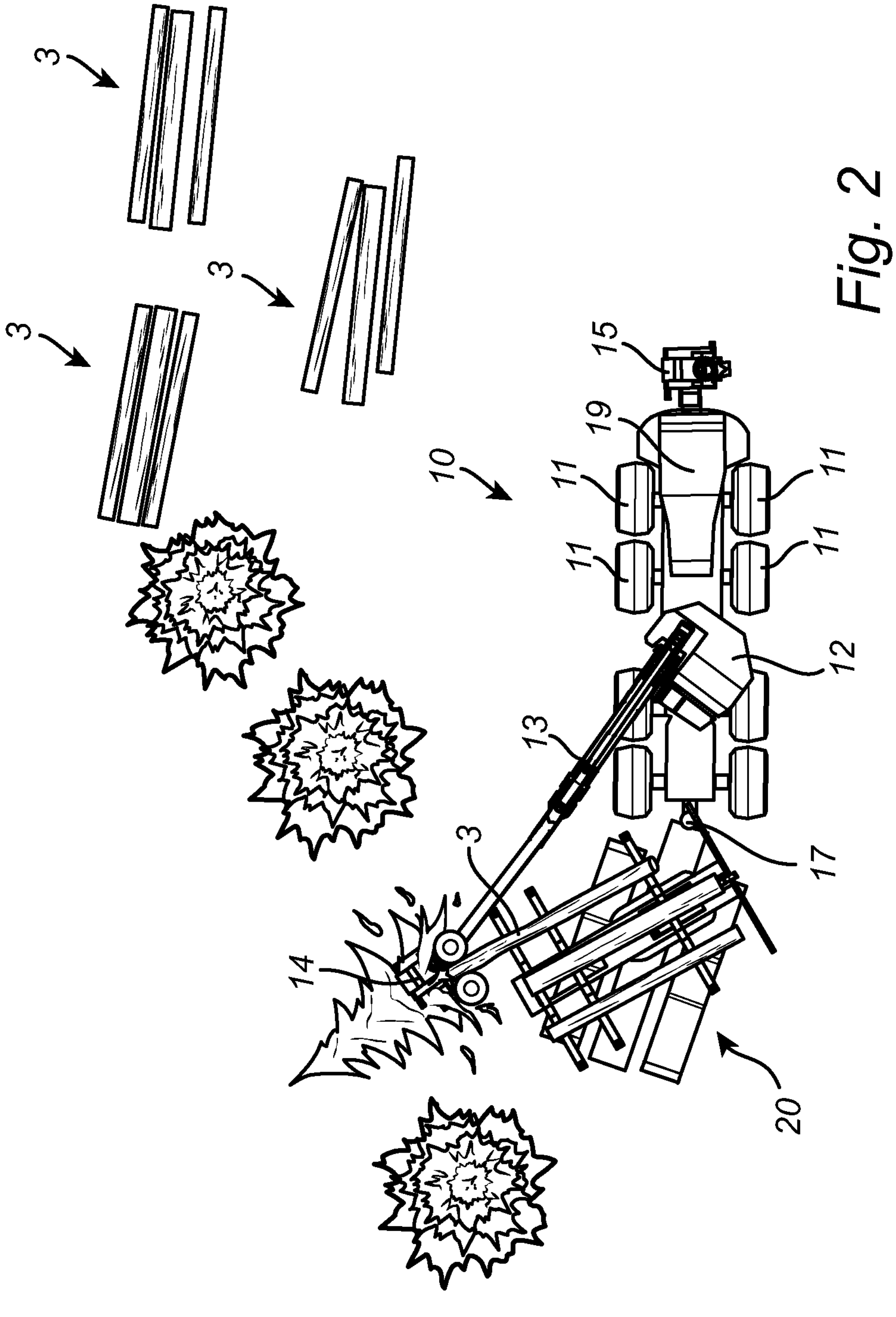
FIG. 2 shows a top view of a harvester according to an embodiment of the present disclosure in a forestry environment.

FIG. 2 shows a top view of a harvester 10 according to an embodiment of the present disclosure in a forestry environment.

The harvester 10 described with reference to FIG. 2 may comprise features, elements and/or functions corresponding to the harvester described with reference to FIG. 1. FIG. 2 is provided for an increased understanding of a harvester 10 according to some embodiments. The same reference numerals in FIGS. 1 and 2 denote the same or similar components, having the same or similar function.

The harvester 10 shown in FIG. 2 is currently operating at a work site, which may also be termed a logging area, and is coupled to a shuttle 20 via an electrical connector 17 of the harvester 10. The harvester 10 is currently delimbing and bucking a tree which it has felled by using the articulated boom 13 and the processing head 14 connected to the articulated boom 13. The harvester 10 has positioned the articulated boom 13 such that the delimbed log 3 may be directly loaded onto a compartment of the coupled shuttle 20. The coupled shuttle 20 has positioned the compartment to allow for easier loading of harvested logs 3 for the harvester 10.

The forestry environment shown in FIG. 2 further comprises three piles of harvested logs 3 which are currently on the ground. It may be understood that the harvested logs 3 may have been harvested by the harvester 10 when there was no shuttle 20 present and has therefore placed the harvested logs 3 on the ground. The harvester 10 further comprises a connect system (not shown, see FIG. 1) configured for enabling the harvester 10 to switch between tools connected to the articulated boom 13. The harvester 10 further comprises a tool holder (not shown, see FIG. 1) in which a log grapple 15 is currently arranged. Thus, the harvester 10 is able to, by using the connect system, switch from the processing head 14 to the log grapple 15 and is thereby able to load the harvested logs 3, which are currently on the ground, onto the coupled shuttle 20.

Figure 3:
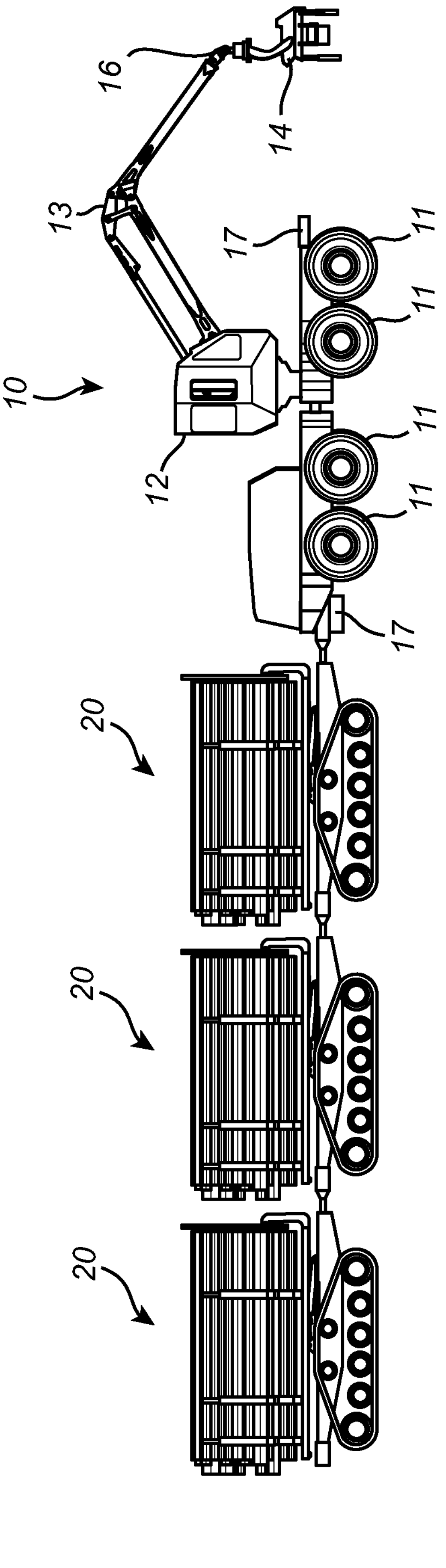
FIG. 3 shows a side view of a harvester and three self-driving shuttles of a forestry system according to an embodiment of the present disclosure.

FIG. 3 shows a side view of a harvester 10 according to an embodiment of the present disclosure.

The harvester 10 described with reference to FIG. 3 may comprise features, elements and/or functions corresponding to the harvester described with reference to FIGS. 1 and 2. FIG. 3 is provided for an increased understanding of a harvester 10 according to some embodiments. The same reference numerals in FIGS. 1, 2, 3 denote the same or similar components, having the same or similar function.

FIG. 3 shows a harvester 10 coupled to three shuttles 20, wherein the shuttles 20 are coupled together in a train configuration. The harvester 10 may be configured to be able to charge a plurality of interconnected shuttles 20, as long as one of the shuttles 20 is connected to the harvester 10 via the electrical connector 17. By being able to charge more than one shuttle 20, the harvester 10 allows for transport of shuttles 20 between, for example, work sites and may be able to charge the shuttles 20 during the transport. Thus, the operation of the harvester 10 and the shuttles 10 may begin as soon as the harvester 10 has reached the work site. Further, by being able to charge more than one shuttle 20, the harvester 10 enables charging during downtime of the operation of the harvester 10, such as during the night. Thus, once operation of the harvester 10 starts the shuttles 20 may be ready for deployment. The harvester 10 is not limited to being coupled to one, two, or three shuttles 20, and may be coupled to substantially any number of shuttles 20.

Figure 4:
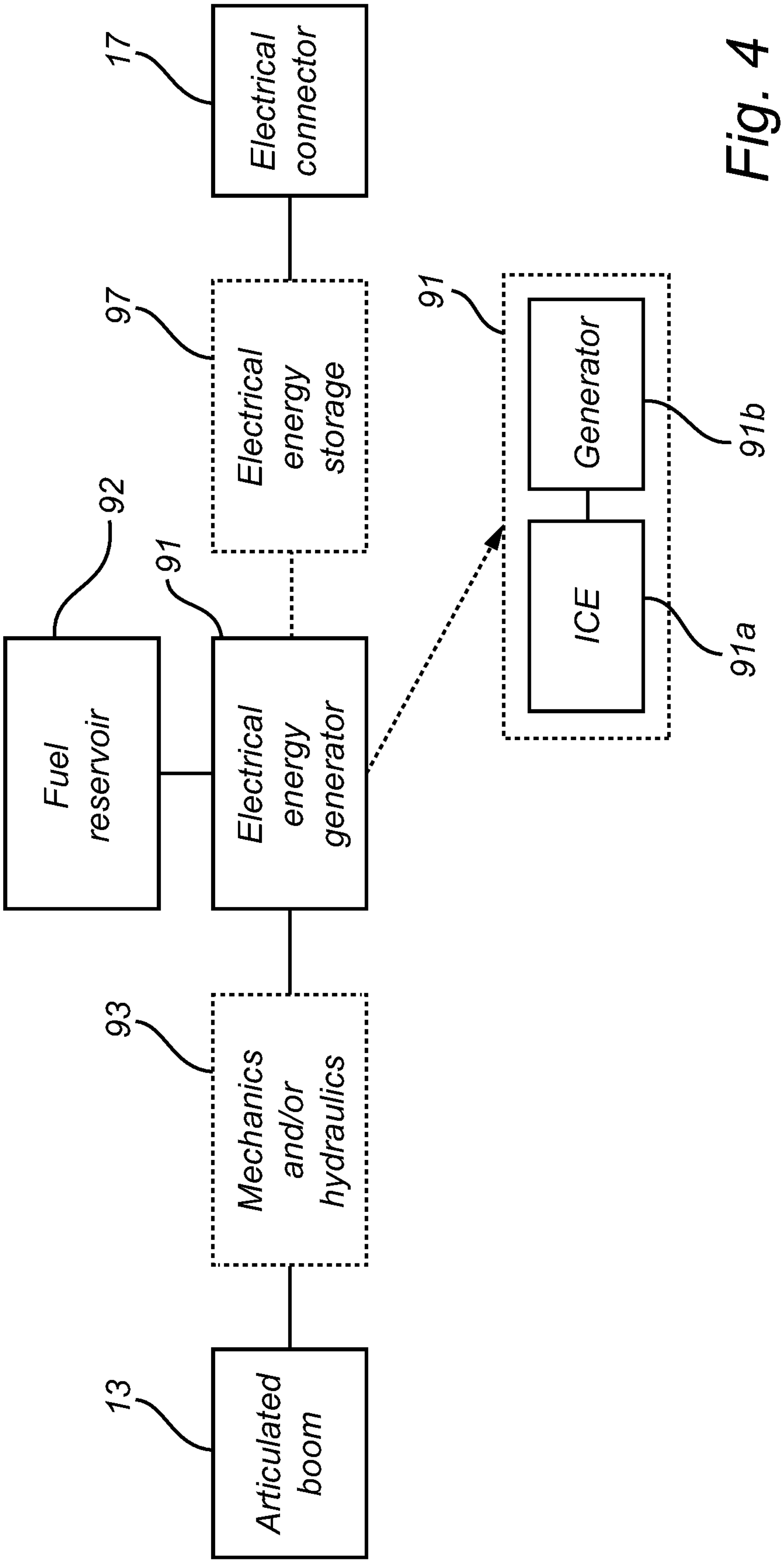
FIG. 4 shows a block diagram of elements of a harvester according to an embodiment of the present disclosure.

FIG. 4 shows a block diagram of elements of a harvester 10 according to an embodiment of the present disclosure.

The block diagram shows elements which may be comprised by a harvester 10 as described with reference to FIGS. 1, 2 and 3. FIG. 4 shows an electrical energy generator 91 connected to a fuel reservoir 92, thereby indicating that the electrical energy generator 91 is configured to be fueled by a fuel from the fuel reservoir 92.

The electrical energy generator 91 may be configured as a fuel cell and may be configured to receive fuel, such as hydrogen, from the fuel reservoir 92.

Alternatively, the electrical energy generator 91 may be configured as an internal combustion engine, ICE, 91*a* connected to a generator 91*b*. The ICE 91*a* may be configured to be fueled by fuel, such as diesel, from the fuel reservoir 92 and configured to deliver mechanical power to the generator 91*b*. The generator 91*b* may be configured to convert the mechanical power into electrical energy.

The electrical energy generator 91 is electrically connected to an electrical connector 17 configured for coupling the electrical energy generator 91 to an electrical energy storage of a shuttle. The electrical energy generator 91 may be coupled to the electrical connector 17 via an electrical energy storage 97 configured to store electrical energy. The harvester is not limited to comprising an electrical energy storage 97, which is indicated by the electrical energy storage 97 being shown with dashed lines.

The electrical energy generator 91 is further configured to supply power to the articulated boom 13 of the harvester. The supplied power may be electrical power. However, the harvester may comprise one or more mechanical device 93 and/or one or more hydraulic device 93 which are powered by the electrical energy generator 13 and which are configured for powering the articulated boom 13. Thus, the articulated boom 13 may be mechanically and/or hydraulically powered.

The electrical energy generator 91 may further, or alternatively, comprise at least one electrical motor configured for powering the traction arrangement and/or the articulated boom 13 of the harvester.

The person skilled in the art realizes that the present disclosure by no means is limited to the preferred embodiments described above. On the contrary, many modifications and variations are possible within the scope of the appended claims.

The invention claimed is:

1. A harvester for harvesting logs comprising a traction arrangement configured to drive the harvester;

an articulated boom configured to connect to a processing head;

a fuel reservoir;

an electrical energy generator fueled by a fuel from the fuel reservoir and configured for supplying power to the traction arrangement and the articulated boon; and an electrical connector configured for coupling the electrical energy generator to an electrical energy storage of a shuttle;

wherein the harvester is configured to load a harvested log onto a coupled shuttle and charge the electrical energy storage of said coupled shuttle using electrical energy from the electrical energy generator.

2. The harvester according to claim 1, wherein the harvester is configured to load said harvested log onto said coupled shuttle at a same time a charging the electrical energy storage of said coupled shuttle.

3. The harvester according to claim 1, wherein the harvester is configured to:

charge said coupled shuttle by a charging amount.

4. The harvester according to claim 1, further comprising the electrical energy storage electrically connected to the electrical energy generator and charged thereby.

5. The harvester according to claim 1, further comprising at least one electrical motor electrically connected to the electrical energy generator and configured for supplying electrical power to the traction arrangement and the articulated boom.

6. The harvester according to claim 1, wherein the electrical energy generator comprises an internal combustion engine, ICE, and a generator, wherein the ICE is fueled by fuel from the fuel reservoir and configured to deliver mechanical power to the generator, wherein the generator is configured to convert the mechanical power into electrical energy.

7. The harvester according to claim 6, wherein the ICE is configured to operate at a determined rate.

8. The harvester according to claim 1, wherein the electrical energy generator comprises a fuel cell.

9. The harvester according to claim 1, wherein the articulated boom comprises a connect system comprising an electrical interface and at least one of a mechanical interface and a hydraulic interface, wherein the connect system is configured to connect to the processing head.

10. The harvester according to claim 9, wherein the connect system is further configured to connect to a log grapple.

11. The harvester according to claim 9, wherein the harvester further comprises a tool holder configured for hold a tool configured to be connected to the articulated boom.

12. The harvester according to claim 1, wherein comprises at least one sensor configured to gather sensory data from an environment around the harvester.

13. The harvester according to claim 1, wherein the harvester is configured for data communication with at least one of a shuttle, and an unmanned aerial vehicle, UAV.

14. The harvester according to claim 1, further comprising an operator cab, and wherein the harvester is configured to be operated by a user within the operator cab.

15. The harvester according to claim 1, wherein the harvester is configured to be remotely operated by a user.

* * * * *